July 28, 1942.  C. B. BORTHWICK  2,291,139
X-RAY APPARATUS
Filed Nov. 8, 1940  5 Sheets-Sheet 1
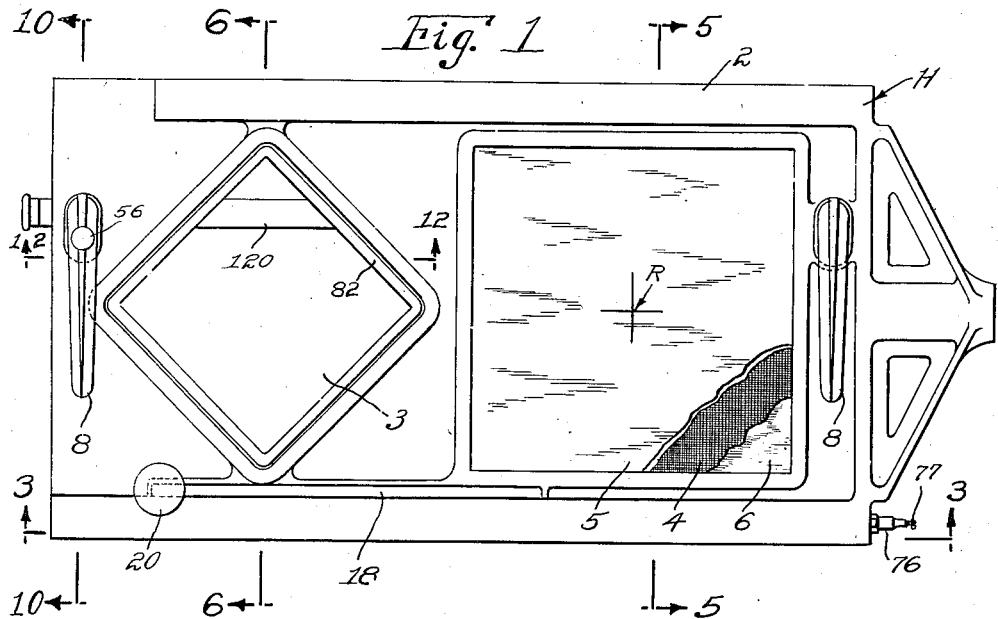
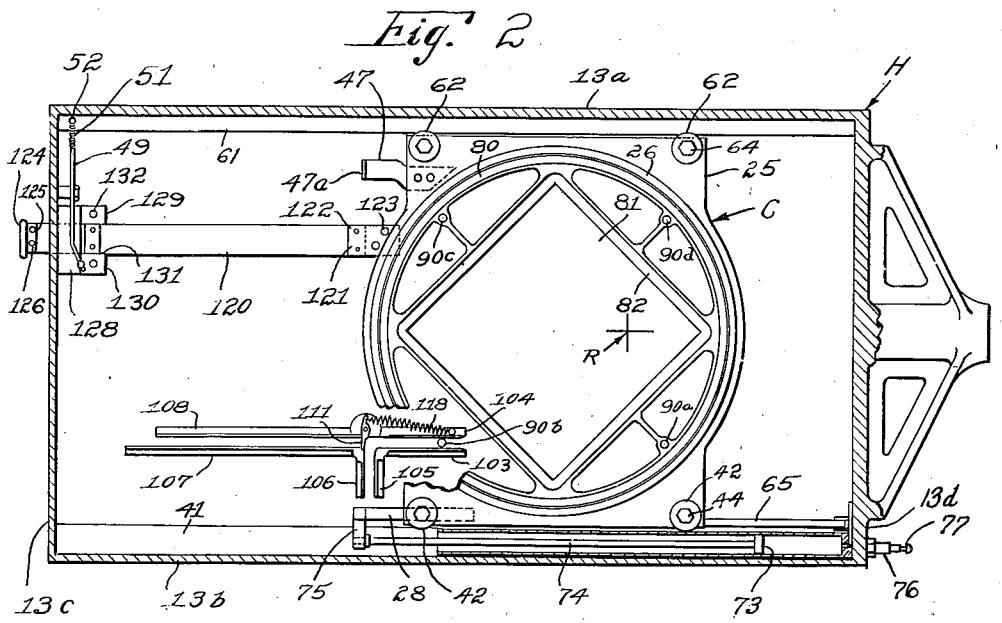
Inventor:
Charles B. Borthwick
by Harold E. Cole
Attorney July 28, 1942.   C. B. BORTHWICK   2,291,139
X-RAY APPARATUS
Filed Nov. 8, 1940   5 Sheets-Sheet 2
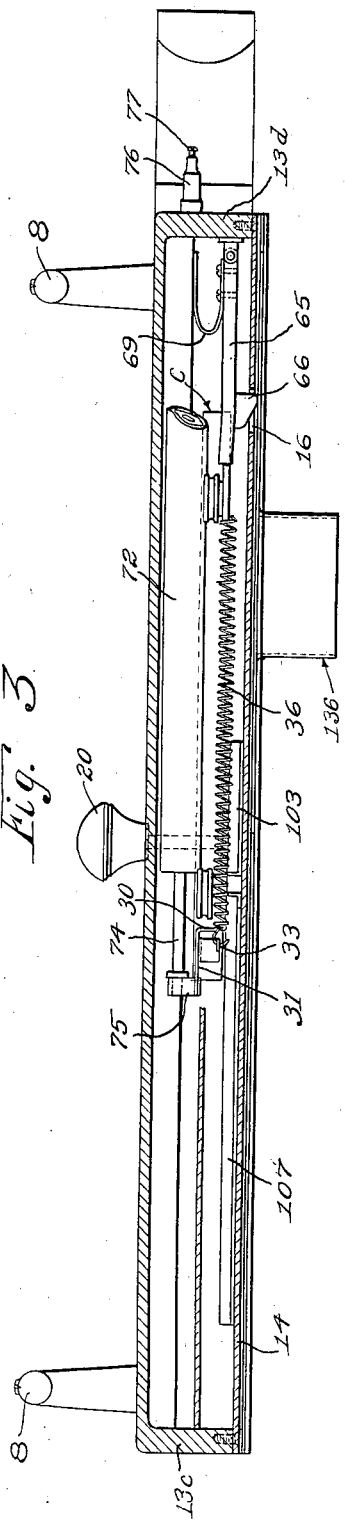
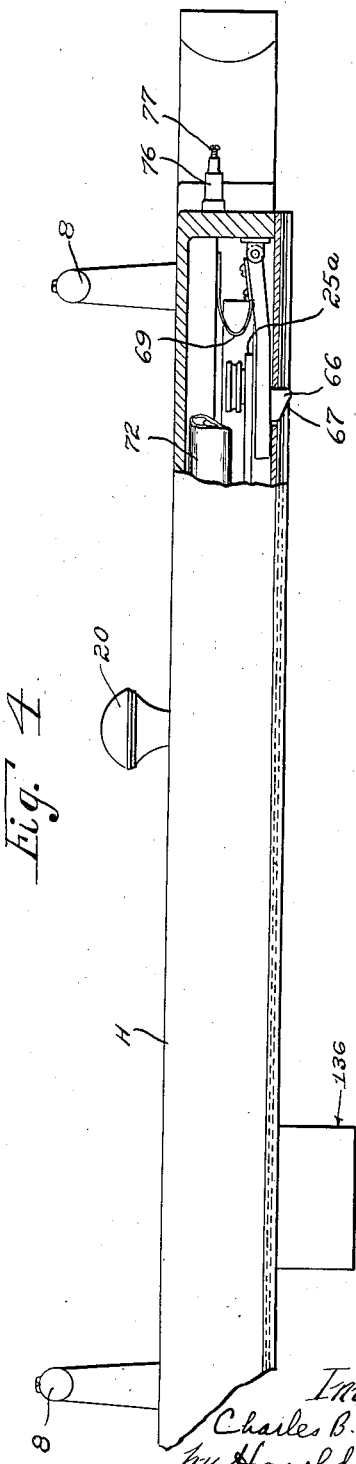
Inventor:
Charles B. Borthwick
by Harold E. Cole
Attorney July 28, 1942.　　　C. B. BORTHWICK　　　2,291,139
X-RAY APPARATUS
Filed Nov. 8, 1940　　　5 Sheets-Sheet 3
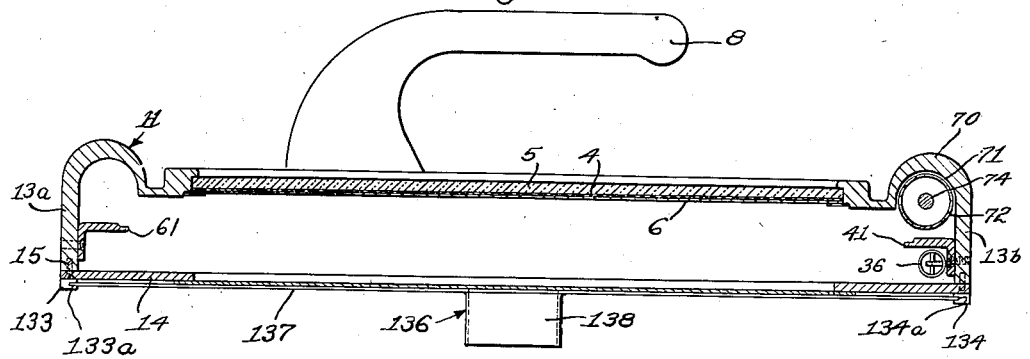
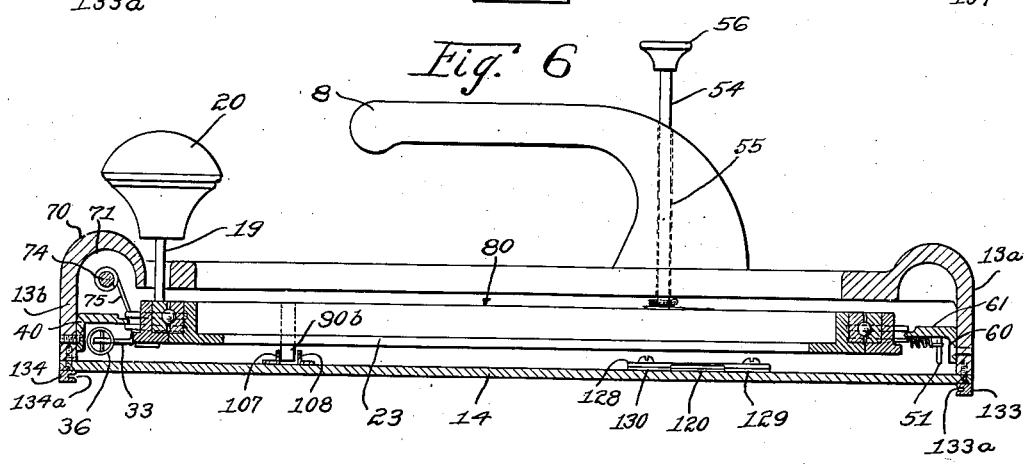
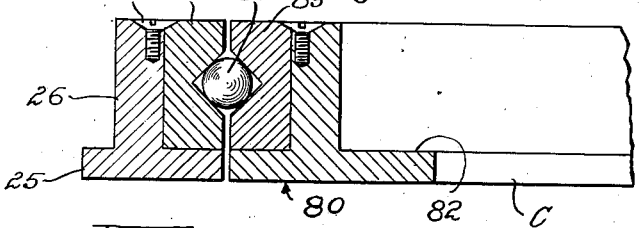
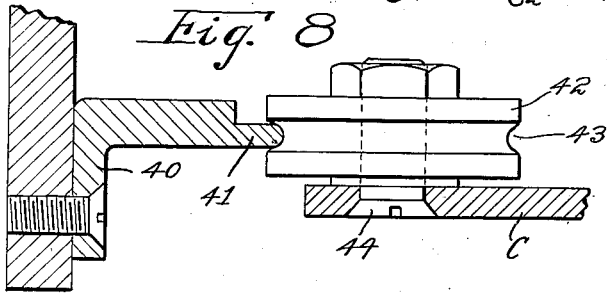
Inventor:
Charles B. Borthwick
by Harold E. Cole
Attorney

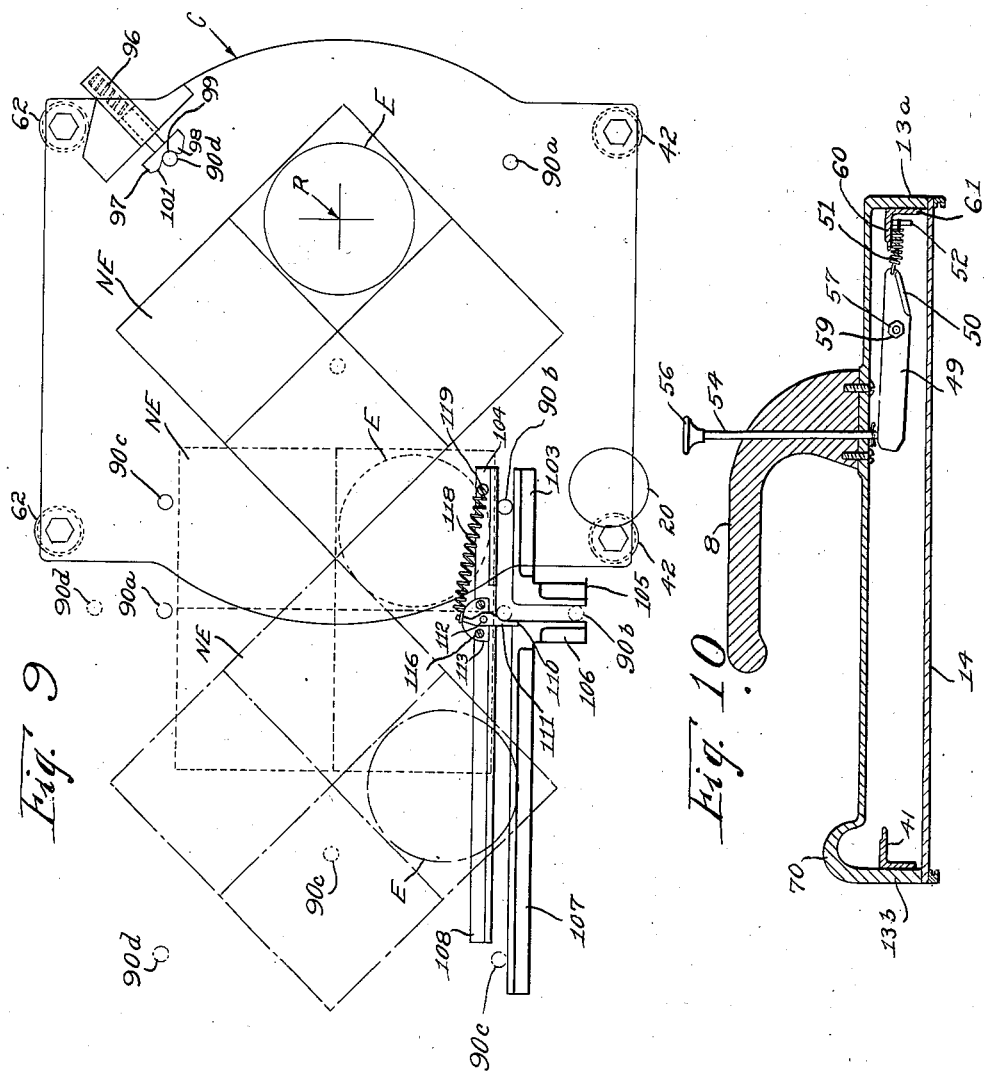

July 28, 1942. C. B. BORTHWICK 2,291,139
X-RAY APPARATUS
Filed Nov. 8, 1940 5 Sheets-Sheet 5
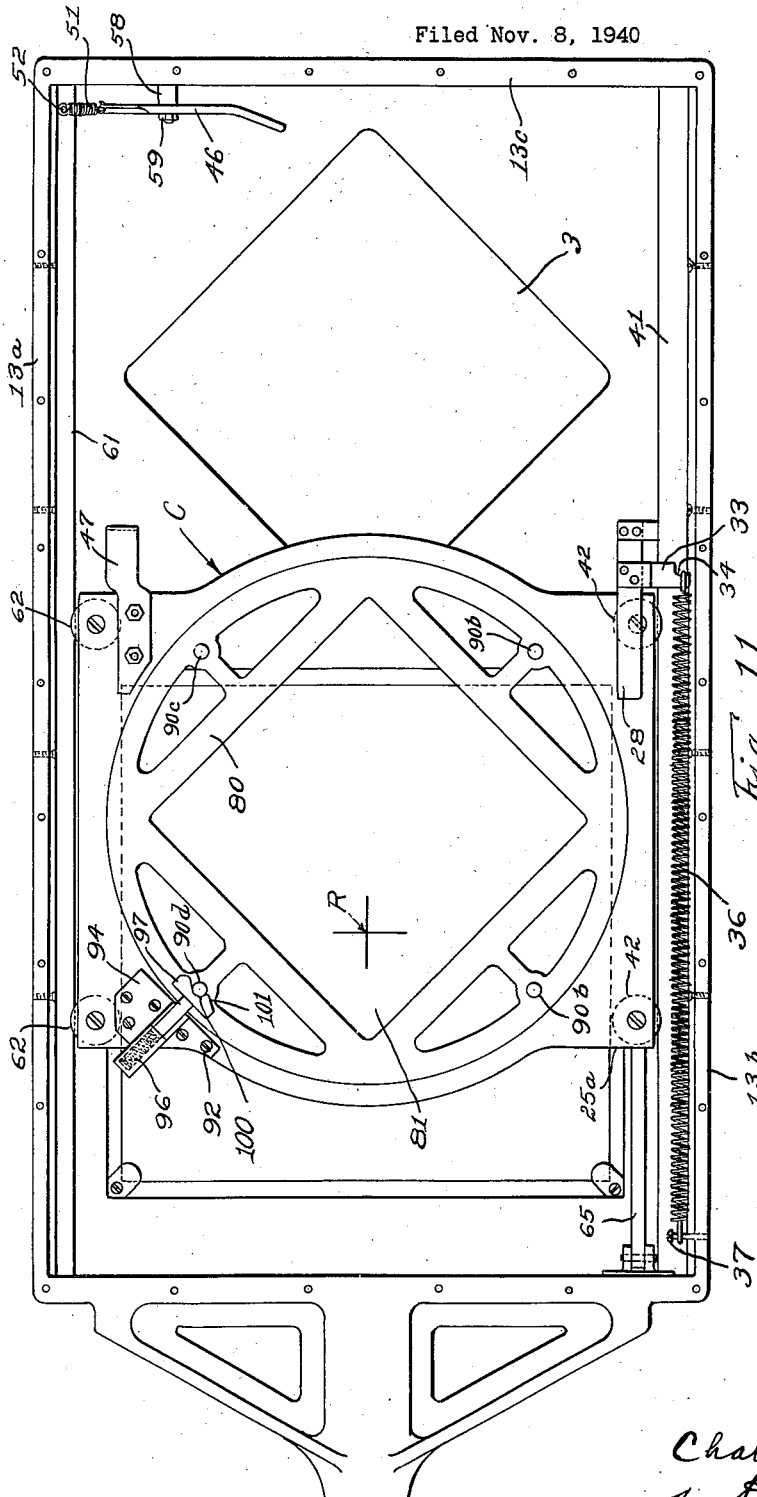
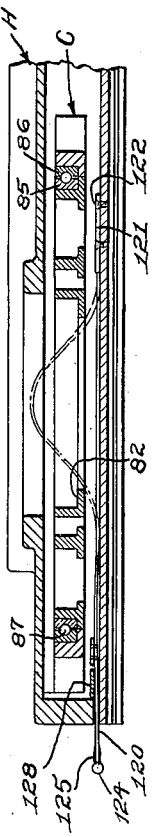
Fig. 11
Fig. 12
Inventor:
Charles B. Borthwick
by Harold E. Cole
Attorney Patented July 28, 1942

2,291,139

UNITED STATES PATENT OFFICE 2,291,139

X-RAY APPARATUS

Charles B. Borthwick, Medford, Mass.

Application November 8, 1940, Serial No. 364,913

14 Claims. (Cl. 250—66)

This invention relates to X-ray apparatus, and more especially to what is commonly called a spot film device.

The principal object of my invention is to provide apparatus whereby a series of X-ray images or pictures may be made up to the full capacity of a film without having to turn over or reverse the position of the cassette that holds the film. Heretofore, when four images, for instance, were to be made on one film, after the first two images were made, usually at the same horizontal level, the casette had to be taken in the hand and reversed so that the next two images could be made at another level on the film. It is my main object to provide a device that will rotate the film-holding cassette from one position of exposure to the next, so that the full series of images to be made on a film are made without having to reverse the position or otherwise handle the cassettes. Thus I eliminate having to take out and turn over the cassette, thereby avoiding an extra operation during the critical exposure period.

Another object is to provide such a device that is simple and certain in operation, and one that can be constructed and assembled at a reasonable cost.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a front elevational view of my apparatus partly broken away, showing the cassette in non-radiograph position.

Figure 2 is a front elevational view of my apparatus, in section with the housing front taken off. It shows the cassette in radiograph position to take an image on a quarter-portion of the film.

Figure 3 is a sectional view taken on the line 3—3 of Figure 1, except that the carriage carrying the cassette has been moved to radiograph position to expose only a quarter portion of the film.

Figure 4 is a bottom view of my apparatus partly broken away, showing the carriage in radiograph position to take a large image on the full film.

Figure 5 is a sectional view taken on the line 5—5 of Figure 1.

Figure 6 is a sectional view taken on the line 6—6 of Figure 1.

Figure 7 is a cross-sectional view showing the ball race in the carriage that carries the cassette.

Figure 8 is an enlarged sectional view showing a rail on which the carriage rollers run.

Figure 9 is a partially diagrammatic view showing the carriage in radiograph position to expose only a quarter portion of the film, and showing three different positions of the cassette in its travel between radiograph and completed non-radiograph position.

Figure 10 is a sectional view taken on the line 10—10 of Figure 1.

Figure 11 is a rear elevational view of my apparatus; but with the back removed, showing the cassette in radiograph position to expose only a quarter portion of the film.

Figure 12 is a sectional view taken on the line 12—12 of Figure 1, to show the means used to force the cassette out of the carriage.

As illustrated, my device has a main housing H consisting of a front 2. Said front 2 has an opening 3 at one side to receive a cassette later described. At the other side of said front is the usual fluorescent screen 4, with a lead glass plate 5 in front, and a Bakelite protective sheet 6 at the rear. Extending forwardly from said front are two grasping handles 8. Four side members—an upper one 13a, a lower one 13b, a left one 13c and a right one 13d—are integral with said front and extend therefrom rearwardly. A portion of said left side member 13c provides stop means to terminate the horizontal movement of a carriage C, later described. A back 14 is fastened to said side members by screws 15. Said back 14 has a small slot 16 in the lower portion thereof. There is a horizontal slot 18 through the lower portion of said front 12 which permits horizontal movement of a rod 19 that extends through said slot 18 and outside said front 2, and to which a knob 20 is attached for convenience.

Said horizontally sliding rod 19 is attached to a carriage C that holds a cassette 23, which in turn holds the film, and as said rod 19 is moved horizontally said carriage C is likewise moved horizontally, within said housing H, as will be explained more fully.

Said carriage C consists of an outside frame 25 which is formed with an inner circular surface 26. At the lower portion of said frame 25 a strap 28 is attached thereto. Said rod 19 extends through said frame 25 and strap 28, fitting tightly in the latter. Said strap 28 extends to the edge of said carriage frame 25, then forms a right-angle portion 30, thence a horizontal portion 31 continues in the original horizontal direction. Extending from said strap 28 at right angles thereto is a right-angled arm 33 having a recessed portion 34 formed at the end thereof. A long coil spring 36 is held in said recessed portion 34 of said arm 33 and extends therefrom to a pin 37 that is set in said bottom side 13b. When said carriage C is in operative or radiograph position to thereby make the image on the film, said spring 36 is not under tension; but when said carriage C is moved to the opposite or non-radiograph position said spring is under tension, so that when the carriage C is released it automatically moves to radiograph position due to the tension of said spring 36.

Fastened to the upper surface of said lower side 13b is a rail support 40 from which extends at a right angle an outstanding rail 41, along which said carriage C travels. Two wheels 42, each having a groove 43 in their peripheral tread, are rotatably mounted on bolts 44 that hold said wheels 42 to said carriage outside frame 25. Said rail 41 extends into said wheel grooves 43 so that said wheels rotatably travel on said rail 41, as said carriage C moves to and from radiograph position.

When said carriage is pulled to non-radiograph position it is automatically held there against the tension of said spring 36 by means of an arm 46 fastened to said carriage outside frame 25 and having a right-angled finger 47 that terminates in a slanting edge. When said carriage C is moved to non-radiograph position said finger 47 passes over and is held behind a pivotal latch 49 that has a top edge 50 slanting downwardly in the opposite direction to the slant of said finger 47. A coil spring 51 is fastened to said latch 49 and extends therefrom to and is connected with a pin 52 that is set in a rail 61, later described. This spring is under sufficient tension to hold said latch 49 in predetermined position except when the slanting edge of said finger 47 strikes against said latch 49 to thereby momentarily force the latter downwardly, while said finger 47 passes over it and is caught behind it. Said latch 49 at its opposite end has a push rod 54 bearing against it, which rod extends through a hole 55 in said housing front 2, while said latch 49, intermediate its ends, is pivotally mounted on a pin 57 set in and extending outwardly from said housing side 13c, being held in position by a collar 58 and nut 59. Merely pressing a knob 56 on the end of said rod 54 moves said latch 49 out of engagement with said finger 47 thereby freeing the latter so that the carriage C is free to move horizontally to radiograph position.

Fastened to the lower surface of said upper side member 13a is a rail support 60 embodying an outstanding rail 61, along which said carriage C travels. Two wheels 62 each having a groove 63 in their peripheral tread are rotatably mounted on bolts 64 that hold said wheels 62 to said carriage outside frame 25. Said rail 61 extends into said wheel grooves 43 so that said wheels rotatably travel on said rail 61 as said carriage C moves to and from radiograph position. This is substantially the same arrangement as previously described for facilitating and guiding the movement of said carriage C along a said lower side.

At the lower end of said left side 13c is a stop member 65 extending into said housing H far enough to stop the movement of said carriage C when it reaches a predetermined radiograph position to take an image on a quarter portion of the film. Said stop member 65 is movably mounted at one end in said side 13d so as to permit its partial rotation so that it may move out of stop position as later explained. There is a bow spring 69 under and bearing against said stop member 65, the tension of which will force said stop member 65 out of the path of travel of said carriage C so that it does not then function as a stop and the cassette 23 may thus be moved to a position to take a full image at the center of the film. When said stop member 65 is forced inwardly against the tension of said spring 69 it serves as a stop when said cassette reaches a predetermined position to take an image on a one-quarter portion of said film. Said stop member 65 has a projecting latch portion 66 having an inclined surface 67 at its outer end.

There is a bulging portion 70, extending horizontally along the lower edge of said housing front 2, which is hollow, to thereby provide a recess 71 in which the hollow cylinder 72 of a pump extends. Said pump has the usual piston 73 and rod 74 that is operatively connected to said carriage C by means of an arm 75 that is fixed to said strap 28 and extends around said piston rod 74, thereby traveling with it. As the carriage C is moved to radiograph position by the tension of said spring 36 said piston 73 and rod 74 travel with said carriage C, thereby cushioning the force of the carriage's movement to radiograph position in the usual way of pumps. At the end of said pump cylinder 72 is a valve 76 that extends outside said side 13d and which can be adjusted by means of a screw 77 to control the air pressure in said cylinder 72.

Rotatably mounted in said carriage outside frame is a cassette holder wheel 80 which slightly clears said outside frame inner surface 26. It has a central opening 81 surrounded by a holding frame 82 to receive said cassette 23. To insure a smooth rotative movement a ball race is provided that is held between said outside frame 25 and said cassette holder wheel 80 by screws 84. Said ball race consists of an inner ball race 85 and an outer ball race 86 between which many balls 87 are movably positioned in the grooves of said races 85 and 86. This ball race insures a smooth rotative movement of said cassette holder wheel 80.

Fixed in and projecting rearwardly from the rear face of said cassette holder wheel 80 are four actuating pins 90a, 90b, 90c and 90d, which are spaced 90 degrees apart, as shown. These pins determine the positions the film F shall be in when the images are made. Position holding means for said cassette holder wheel 80 have an enclosure member 94 fastened to said outside frame 25 by screws 92. In the interior of said enclosure member 94 is a coiled spring 96 which normally forces a positioning latch 97 outwardly against whichever one of said four pins 90a, 90b, 90c and 90d is opposite it. Said latch 97 has a clutch member 98 at one end in which is formed a clutch recess 99 having a stop cam surface 100 and an inclined retarding surface 101. Said stop surface 100 prevents any reverse or return motion of said wheel 80 once a said pin is engaged in said clutch recess 99. Forward rotative movement is possible, however, because of the shape of the said inclined cam surface 101 which permits rotation of said wheel 80 in one direction if enough force is applied to overcome the pressure of said spring 96.

Said cassette square holding frame 82 is in such a position when said wheel 80 has rotated and thereby carried said film to an image-taking position shown in Figure 9 of the drawings, that the four lines bordering the square frame extend so as to form an angle, preferably of 45 degrees, with a horizontal line, and when said cassette 23 is placed in said frame 82 it must be in alinement with the opening 3 in said housing front 2.

Fastened to the inner surface of said housing back 14 is a pair of horizontal guides 103 and 104 for said pins, which are spaced apart. One said guide has a downwardly extending portion 105 opposite which and spaced therefrom is another downwardly extending guide 106. There is also another pair of horizontal guide 107 and 108 spaced apart extending from the top of said downwardly extending guide portion 106. Said pairs of guides provide defined spaces for said positioning pins to travel in. Said vertical guide 106 has a notched stop portion 110 against which a stop latch 111 normally bears. Said stop latch 111 is rotatably mounted on a pin 112 set in a plate 113 that is fastened to said back 14 by screws 116. A coil spring 118 is fastened at one end to said stop latch 111 and at the other end to a screw 119 that holds said guide 104 to said housing back 14. The tension of said spring 118 normally holds said stop latch 111 against said stop portion 110.

In operation, as said carriage C is moved horizontally away from radiograph position a said actuating pin which, as shown in Figure 9 of the drawings, happens to be pin 90b, travels between said guides 103 and 104 and after it contacts said stop latch 111 said wheel 80 is forced to rotate as the same said pin 90b passes down between said vertical guides 105 and 106. This change of direction from horizontal to vertical of the said actuating pin 90b causes said wheel to commence a rotative movement which continues until a quarter turn of said wheel 80 is completed. As said actuating pin 90b travels downwardly in said vertical groove the said wheel 80 rotates approximately an eighth of a revolution and likewise rotates the same distance as it moves upwardly in the same said groove, which occurs as said wheel 80 passes beyond center. This one-quarter revolution presents the said cassette 23 and film so that the center of the quarter portion of the film to be exposed is in alinement with the center of the fluoroscopic screen 4. In Figure 9 of the drawings said cassette 23 is shown in radiograph position at the right in full lines. The dotted lines show it in the position where said pin 90b has moved downwardly between said guides 105 and 106, so that said cassette has been rotated 1/8 of a revolution. The said cassette 23 is shown in the dot and dash position in said Figure 9 in non-radiograph position but with an unused portion of said film ready to be moved into radiograph position by a horizontal movement of said carriage C. It will be noted in said Figure 9 of the drawings that exposed portion E of said film is in radiograph position, and that on the return movement of said carriage C to non-radiograph position said exposed portion E has been rotated 90 degrees to the position shown at the left in dot and dash lines, leaving the next quarter portion NE of said film in what I term next-exposure position to make the next exposure when said carriage C is moved horizontally to radiograph position. It will be noted that said pin 90c has rotated into a position whereby it is ready to enter the space between tracks 107 and 108 and will slide therein as said carriage C is returned to radiograph position, forcing said latch 111 open to allow its passage through and into the space between said guides 103 and 104, where it is in position to become the next actuating pin on the next movement of said carriage to non-radiograph position.

It will also be noted that when said cassette 23 has the said portion E of the film in exposed position, as shown in the full lines at the right in Figure 9 of the drawings, said pin 90d is held in said recess 99 of said positioning latch 97. Said stop cam surface 100 will prevent any return rotative movement of said pin 90d and said inclined cam surface 101 will retard any progressive movement of said pin 90d so that it will not be moved out of said recess 99 until said pin 90b passes downwardly in the space between said guides 105 and 106. During this latter movement the other pin 90a is moving to a position where it will be the next pin to enter said recess 99.

In order to readily remove said cassette 23 after the exposures I provide a spring steel flat strap 120 that is fastened at one end to a plate 21 by rivets 122, which plate 121 is attached to the said back 14 by screws 123. Said end of said strap 120 is laterally beyond and rearwardly of said cassette 23 when the latter is in non-radiograph position in my housing. The other end of said strap 120 has a handle 124 fastened thereto by means of a reinforcing member 125 and rivets 126 holding said handle and strap together.

Guide means for said strap 120 consist of a vertical guide member 128 and two horizontal guide members 129 and 130 below it and extending laterally beyond it, thereby providing a recess 131 between said vertical guide members and said back 14 in which said strap handle 124 slides. Screws 132 hold said guides to said back 14. When said strap handle 124 is pushed horizontally inward said strap 120 flexes away from said back 14 and takes on the form of a bow shown by dot and dash lines in Figure 12, thereby forcing said cassette 23 outwardly.

On said housing back 14 there is a gib plate 133 extending along the top edge having a groove 133a therein. There is a similar gib plate 134, with a groove 134a therein, along the lower edge of said back 14. Slidable in said grooves 133a and 134a is a compression cylinder member 136 having the usual protective plate 137 and projecting cylinder 138. When a full exposure is made this compression cylinder member 136 is not used, and said latch 66 projects through said slot 16 so that said stop member 65 is not in stop position to terminate the movement of said carriage C. Consequently said carriage C continues on to the full-exposure position shown in Figure 4 of the drawings.

In taking a spot exposure on one-quarter portion of the film said compression cylinder member is first slid along said back 14 in said gib plate grooves 133a and 134a until it reaches radiograph position, where said projecting cylinder 138 registers with the central ray R to take a spot image, as in the position shown in Figure 2 of the drawings. In sliding said compression cylinder member to radiograph position said protective plate 137 turns over said latch inclined surface 67 and forces said latch 66 inwardly thereby moving said stop member 65 into the path of said carriage frame 25. When said carriage C is moved to radiograph position a lower stop portion 25a of said carriage frame 25 strikes said stop member 65 to thus terminate the movement of said carriage C, and thus said cassette 23 is located in spot radiograph position shown in Figure 2 of the drawings, in registry with said central ray R and said cylinder 138, and the center portion of said fluoroscopic screen 4.

What I claim is:

1. X-ray apparatus comprising cooperative wheel actuating means, a housing, a carriage in said housing, said carriage and housing embodying instrumentalities that permit horizontal movement of said carriage in said housing, said carriage embodying a wheel rotatably mounted therein, said wheel embodying means to hold a film-carrying cassette, said wheel embodying actuating instrumentalities cooperative with said cooperative wheel actuating means whereby upon reaching a predetermined position during said horizontal movement of said carriage said wheel is caused to rotate.

2. X-ray apparatus comprising a housing, a carriage movably mounted in said housing and adapted to be moved horizontally between radiograph and non-radiograph positions, said carriage embodying a wheel rotatably mounted therein adapted to carry a film holding cassette, said wheel embodying positioning actuating means and said housing embodying members cooperative with said actuating positioning means at a predetermined point in a horizontal movement of said carriage whereby said wheel and said cassette are rotated to a predetermined next-exposure position, said housing embodying stop means so positioned with relation to said carriage that said stop means terminates the horizontal movement of said carriage when said wheel has been rotated to said next exposure position.

3. X-ray apparatus comprising a housing, a carriage movably mounted in said housing and adapted to be moved horizontally between radiograph and non-radiograph positions, said carriage embodying a wheel rotatably mounted therein adapted to carry a film holding cassette, said wheel embodying positioning actuating means and said housing embodying members cooperative with said actuating positioning means at a predetermined point in a horizontal movement of said carriage whereby said wheel and said cassette are rotated 90 degrees to a predetermined next-exposure position, said housing embodying stop means so positioned with relation to said carriage that said stop means terminates the horizontal movement of said carriage when said wheel has been rotated said 90 degrees to said next-exposure position.

4. X-ray apparatus comprising supporting means embodying stop means, a carriage movably mounted in said supporting means embodying a wheel rotatably mounted in said carriage, said wheel embodying means to hold a film-carrying cassette and carrying actuating members that extend outwardly and are so positioned that when said carriage and wheel reaches a predetermined position a said actuating member strikes said stop means thereby causing said wheel to rotate.

5. X-ray apparatus comprising a housing, a carriage movably mounted in said housing and adapted to be moved between radiograph and non-radiograph positions, said carriage embodying a wheel rotatably mounted therein adapted to carry a film-holding cassette, said wheel embodying actuating positioning pin members adjacent the outer periphery thereof, and said housing embodying means in the path of movement of said pin members cooperative with said pin members at a predetermined point in said path of movement of said carriage whereby said wheel and said cassette are moved to a predetermined next-exposure position.

6. X-ray apparatus comprising a housing embodying stop means, a carriage movably mounted in said housing, means associated with said housing and carriage to facilitate horizontal movement of said carriage in said housing, said carriage embodying a wheel rotatably mounted therein, said wheel embodying means to hold a film-carrying cassette and a plurality of actuating members spaced a substantially equal distance apart and so positioned that when said wheel reaches a predetermined position a said actuating member strikes said stop means thereby causing said wheel to rotate independently of the horizontal movement of said carriage.

7. X-ray apparatus comprising a housing embodying stop means, a carriage movably mounted in said housing, means associated with said housing and carriage to facilitate horizontal movement of said carriage in said housing, said carriage embodying a wheel rotatably mounted therein, said wheel embodying means to hold a film carrying cassette and actuating members so positioned that when said carriage and wheel reach a predetermined position during a horizontal movement of said carriage a said actuating member strikes said stop means thereby causing said wheel to rotate independently of the horizontal movement of said carriage, and position holding means attached to said carriage adapted to restrain said wheel from further rotative movement when it reaches a predetermined position.

8. X-ray apparatus comprising a housing embodying stop means, a carriage movably mounted in said housing, means associated with said housing and carriage to facilitate horizontal movement of said carriage in said housing, said carriage embodying a wheel rotatably mounted therein, said wheel embodying means to hold a film carrying cassette and actuating members so positioned that when said carriage and wheel reach a predetermined position during a horizontal movement of said carriage a said actuating member strikes said stop means thereby causing said wheel to rotate independently of the horizontal movement of said carriage, and position holding means attached to said carriage adapted to restrain said wheel from further rotative movement when it reaches a predetermined position, said position holding means embodying a clutch member having a clutch recess in which one of said actuating members is adapted to enter and restrain said wheel from further rotative movement in either direction when it reaches said predetermined position.

9. X-ray apparatus comprising a housing embodying stop means, a carriage movably mounted in said housing embodying an outside frame having a circular opening therein, a wheel rotatably mounted within said circular opening, said wheel embodying means to hold a film-carrying cassette and actuating positioning pin members so positioned that when said wheel reaches a predetermined position a said actuating pin member strikes said stop means thereby causing said wheel to rotate.

10. X-ray apparatus comprising a housing, a carriage movably mounted in said housing, said carriage embodying position holding instrumentalities and a wheel rotatably mounted therein, said wheel embodying a rectangular frame to hold a film-carrying cassette, said housing embodying means and said wheel embodying pin members cooperative with said means at predetermined points to cause rotation of said wheel to commence when movement of said carriage brings a said pin member into contact with said means, said pin members being so positioned in said wheel with respect to said holding instrumentalities that when said wheel completes its rotative movement a said pin member is held by said instrumentalities and the sides of said frame extend at an angle to a horizontal line.

11. X-ray apparatus comprising a housing embodying horizontal and vertical guide means, a stop member, a carriage movably mounted in said housing, said carriage embodying a wheel rotatably mounted therein, said wheel embodying means to hold a film-carrying cassette, said wheel embodying actuating pin members which are so positioned that as said carriage is moved one of said pin members travels in said horizontal guide means and strikes against said stop means whereby said wheel is caused to rotate and said pin to travel in said vertical guide means whereby said wheel and cassette are moved to next-exposure position.

12. X-ray apparatus comprising a housing embodying horizontal and vertical guide means, a stop member adjacent the juncture of said guide means, a carriage movably mounted in said housing, said carriage embodying a wheel rotatably mounted therein, said wheel embodying means to hold a film-carrying cassette, said wheel embodying actuating pin members which are so positioned that one is normally at an angle to a horizontal line and as said carriage is moved the latter said pin member travels in said horizontal guide means until it strikes against said stop means whereby said wheel is caused to rotate and said pin to travel down in said vertical guide means and then upwardly, whereby said wheel and cassette are moved to next-exposure position.

13. X-ray apparatus comprising a housing, a carriage movably mounted in said housing, said carriage embodying a wheel rotatably mounted therein, said wheel fixedly carrying a rectangular frame to hold a single film-carrying cassette, said housing and wheel each embodying means cooperative with each other at a predetermined point to cause rotation of said wheel, said frame being so positioned in said wheel, that when said wheel has been rotated to next-exposure position the sides of said frame extend diagonally.

14. X-ray apparatus comprising a housing, a carriage movably mounted in said housing, said carriage embodying a wheel rotatably mounted therein, said wheel fixedly carrying a rectangular frame to hold a single film-carrying cassette, said housing and wheel each embodying means cooperative with each other at a predetermined point to cause rotation of said wheel, said frame being so positioned in said wheel that the sides of said frame extend at angles of substantially 45 degrees when said wheel is in next-exposure position.

CHARLES B. BORTHWICK.